# United States Patent [19]

Fretz, Jr. et al.

[11] 4,440,944

[45] Apr. 3, 1984

[54] FIRE RETARDANT EPOXY RESINS CONTAINING 3-HYDROXYALKYLPHOSPHINE OXIDES

[75] Inventors: Edward R. Fretz, Jr., East Windsor; Joseph Green, East Brunswick, both of N.J.

[73] Assignee: FMC Corporation, Philadelphia, Pa.

[21] Appl. No.: 463,177

[22] Filed: Feb. 3, 1983

Related U.S. Application Data

[62] Division of Ser. No. 369,786, Apr. 19, 1982, Pat. No. 4,380,571, which is a division of Ser. No. 264,256, May 18, 1981, Pat. No. 4,345,059.

[51] Int. Cl.³ ............................................. C08G 59/62
[52] U.S. Cl. ..................................................... 560/76
[58] Field of Search .................. 560/76, 120, 195, 85, 560/89

[56] References Cited

U.S. PATENT DOCUMENTS

| 2,916,473 | 12/1959 | Bullock et al. | 260/47 |
|---|---|---|---|
| 3,008,926 | 11/1961 | Reuter et al. | 260/67.6 |
| 3,192,242 | 6/1965 | Birum | 260/461 |
| 3,242,217 | 3/1966 | Hamann et al. | 260/606.5 |
| 3,258,492 | 6/1966 | Ritt et al. | 260/606.5 |
| 3,645,919 | 2/1972 | Kerst | 528/398 |
| 3,661,857 | 5/1972 | Kerst | 260/75 N R |
| 3,666,543 | 5/1972 | Maier | 117/136 |
| 3,716,580 | 2/1973 | Maier | 260/488 J |
| 3,888,942 | 6/1975 | Tsen | 260/830 TW |
| 3,981,832 | 9/1976 | Godfried | 260/2.5 EP |
| 4,151,229 | 4/1979 | Zondler | 260/968 |

FOREIGN PATENT DOCUMENTS

| 2538675 | 3/1977 | Fed. Rep. of Germany . |
| 782445 | 4/1978 | South Africa . |
| 1487609 | 10/1977 | United Kingdom . |

*Primary Examiner*—Earl A. Nielsen
*Attorney, Agent, or Firm*—Robert D. Jackson; Robert W. Kell; Eugene G. Horsky

[57] ABSTRACT

Epoxy resins are rendered fire retardant by the addition thereto of a 3-hydroxyalkylphosphine oxide. Other halogen containing flame retardants may or may not be present in the composition. Mixtures containing a brominated epoxide and/or a halogenated phosphine oxide provide a high level of flame retardance at low levels of the additive. The epoxy resins may be heat cured in the presence of an acid anhydride or amine to form a polymer having the phosphine oxide incorporated in the polymer molecule.

1 Claim, No Drawings

FIRE RETARDANT EPOXY RESINS CONTAINING 3-HYDROXYALKYLPHOSPHINE OXIDES

This application is a division of application Ser. No. 369,786, filed 4/19/82, now U.S. Pat. No. 4,380,571, issued 4/19/83, which is a division of application Ser. No. 264,256, filed 5/18/81, now U.S. Pat. No. 4,345,059, issued 8/17/82.

The present invention relates to thermosetting epoxy resin compositions which are rendered flame retardant by having combined therewith an effective amount of a hydroxyalkylphosphine oxide.

The epoxide resins are well known and have been described in numerous publications. To improve flame retardant characteristics, epoxy resins have been compounded with phosphate and phosphonate esters including those containing haloalkyl groups as described in British Pat. No. 1,487,609, U.S. Pat. No. 3,192,242 and South African Pat. No. 18201/77. The use of triphenylphosphine as a flame retardant additive for epoxy resins was described by Martin and Price, J. Applied Polymer Science, 12, 143–158 (1968).

Tetrakishydroxymethylphosphonium chloride and trishydroxymethylphosphine oxide have also been used in epoxy resins as described in U.S. Pat. No. 2,916,473, and aminoalkylphosphonic acid esters are suggested as fire retardant hardeners for epoxy resins in U.S. Pat. No. 4,151,229.

The Maier U.S. Pat. Nos. 3,666,543 and 3,716,580 disclose 2-hydroxyalkylphosphine oxides and halogenated derivatives thereof that are said to have utility as flameproofing agents. However, the known flame retardant additives for epoxide resin compositions suffer generally from one or more deficiencies including low compatibility, low thermal stability, or poor fire retardant behavior.

In accordance with the present invention, it has now been discovered that the addition of a small but effective amount of a 3-hydroxyalkylphosphine oxide to an epoxy resin will increase its resistance to burning. The 3-hydroxyalkylphosphine oxides may be used with either amine or anhydride hardeners and they may be used alone or in combination with halogen, and especially bromine, containing epoxide resins. When the epoxide resin is heat cured in the presence of the 3-hydroxyalkylphosphine oxide and an anhydride or amine hardener, the phosphine oxide is believed to react with the hardener and/or terminal epoxy groups to become incorporated in the polymer molecule. Useful phosphine oxides that impart fire resistance to epoxy resins are those phosphine oxides having the general formula:

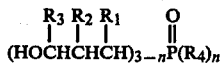

wherein $R_1$ may be the same or a different radical selected from the group consisting of hydrogen, phenyl, hydroxymethyl and alkyl radicals of 1–4 carbon atoms, $R_2$ may be the same or a different radical selected from the group consisting of hydrogen, hydroxymethyl, and alkyl radicals of 1–4 carbon atoms, $R_3$ may be the same or a different radical selected from the group consisting of hydrogen and methyl radicals; $R_4$ is an alkyl radical of 2–8 carbon atoms and n is either 0 or 1. Particularly effective phosphine oxide additives for increasing the fire resistance of epoxide resin are tris(3-hydroxypropyl)phosphine oxide, tris(2-methyl-3-hydroxypropyl)phosphine oxide, sec-butyl bis(3-hydroxypropyl)phosphine oxide and mixtures of the same. Such preferred phosphine oxides may be conveniently prepared by reacting phosphine with allyl alcohol and/or methallyl alcohol followed by oxidation of the resulting tertiary phosphine. To prepare mono sec-butyl phosphine oxide, the phosphine is first reacted with butene followed by the addition of allyl alcohol.

Suitable 3-hydroxyalkylphosphine oxides for use as fire retardants in the present invention may also be prepared by reacting phosphine with other commercially available alcohols such as 1-butene-3-ol, 2-butene-1-ol, 2-heptene-1-ol, cinnamyl alcohol, 2-butyl-2-propene-1-ol, butene-2-diol 1,4 and 2-hydroxymethyl propene-1-ol-3.

Although any of the known hardeners for epoxy resins may be used in conjunction with the phosphine oxide flame retardant additives, the amine and anhydride hardeners are particularly preferred. The 3-hydroxyalkylphosphine oxides may, if desired, be reacted with a typical cyclic dicarboxylic acid anhydride such as phthalic anhydride, nadic methyl anhydride, etc., to form an intermediate ester which will further react in an epoxy resin system to produce a cured flame retardant object. Alternatively, the 3-hydroxyalkylphosphine oxides may be reacted with the epoxy resin monomers such as epichlorohydrin with elimination of hydrochloric acid to give a glycidyl ether derivative. Such intermediates would have excellent compatibility with epoxy resins and minimize the reaction between the hardener and the three hydroxy groups of the phosphine oxide.

Alternatively, the 3-hydroxyalkylphosphine oxides may be mixed with or partially reacted with the uncured epoxy resins followed by addition of the hardener, anhydrides or amines to cure the resin.

Other suitable hardeners for the epoxy resins containing 3-hydroxyalkylphosphine oxides are the aromatic amines such as methylene dianiline or other amines such as dicyandiamide or other higher temperature curing agents such as 4,4' diaminodiphenyl sulfone, or $BF_3$-monoethylamine complex.

The particular epoxy resin and the specific hardener that is used are not critical as the hydroxyalkylphosphine oxides herein described will react with all of the known epoxy resins. The hardeners employed need not be limited to those mentioned above as all hardeners common to epoxy resin technology may be used to obtain the fire retardant epoxy resins of the present invention.

It will be understood that if the functionality of the epoxy resin and/or the phosphine oxide and/or the hardener is three or greater crosslinking may occur with the production of infusable molded objects whereas when the functionality of the phosphine oxide, epoxy resins and anhydride or amine is two or less, thermoplastic resins are obtained.

Mixtures may be prepared of the 3-hydroxyalkylphosphine oxides and hardeners prior to addition of the epoxy resin monomer. Such phosphine oxide-hardener intermediate may be prepared by heating the phosphine oxide with, for example, anhydrides at a temperature between 70° C. and 120° C. until a solution forms. Mixed anhydrides such as mixtures of phthalic anhydride and nadic methyl anhydride in all proportions may be used. The phosphine oxide may be present in amounts up to 25% by weight or more in the final resin formulation but is optimally present in amounts from about 5% to about 20% by weight based upon the weight of epoxide present. When anhydrides are used as the hardener, stoichiometric amounts are preferred, i.e., the ratio of the moles of dibasic anhydride to the equivalents of epoxide is desirably from about 0.80 to about 1.2. Optimally, the ratio of the moles of anhydride to the equivalents of epoxide is between about 0.90 and about 1.0.

In those cases where the solubility of the 3-hydroxyalkylphosphine oxide in the epoxy resin monomers is not a problem, the phosphine oxide can be mixed with the epoxy resin first, an anhydride hardener first, or all three can be mixed at once. The 3-hydroxyalkylphosphine oxides were found to have an accelerating effect upon the cure of epoxy resins such that no additional accelerators are required.

The resin mixtures herein described were cast into sheets by heating in molds consisting of mylar-lined glass plates with teflon spacers. Fillers may be added to the resin-phosphine oxide mixtures which can then be compression, transfer or injection molded. The epoxy resin mixtures of the present invention can also be used as laminating resins using either dry molding or wet lay-up techniques. The preferred substrate is glass cloth but a woven or non-woven fabric or sheets of cellulose may be substituted for the glass cloth to obtain a laminate having different physical and electrical properties. Such epoxy resins can be used in any application involving epoxy resins but are most suited for electrical applications including laminated printed circuit boards, potting compounds, castings, encapsulations, molding powders, etc. The 3-hydroxyalkylphosphine oxide-epoxy resin compositions may also be used as coatings, sealants or adhesives, and can be used with or without fillers and other additives.

The physical and electrical properties of those epoxy resins cured in the presence of phosphine oxide additives are essentially identical to those epoxy resins containing no additives and the thermal properties such as glass transition temperature, and heat distortion temperature did not vary substantially from those resins that contained no 3-hydroxyalkylphosphine oxide. With the proper formulation and curing temperature such variations, as do exist, may be made very small.

The 3-hydroxyalkylphosphine oxides described herein may be used as the sole flame retardant in epoxy resins or may be used in combination with other halogen-containing flame retardants. Especially effective are mixtures containing tris(3-hydroxypropyl)phosphine oxide in combination with a brominated bisphenol A based resin such as the diglycidyl ether of tetrabromobisphenol A (manufactured by the Dow Chemical Company of Midland, Mich. under the trademark DER 542 ®).

The following Examples are intended to illustrate some of the more preferred aspects of the present invention and, accordingly, should not be considered as necessarily limiting the scope of the invention. All parts are expressed in parts by weight unless otherwise specified.

EXAMPLE I

A mixture of tris(3-hydroxypropyl)phosphine oxide, 18.0 g (0.08 mole), phthalic anhydride, 30.0 g (0.20 mole) and 18.0 g (0.10 mole) of nadic methyl anhydride were heated and stirred in a beaker under nitrogen to about 120° C. for 15–20 minutes until a homogeneous solution formed. The mixture on cooling to room temperature was a viscous oil. This mixture was again heated to 100° C. and 60 g (0.321 equivalents) of an epoxy resin derived from 2 moles of epichlorohydrin and 1 mole of 2,2-bis(4-hydroxyphenyl)propane (bisphenol A) having a viscosity of 110 to 150 poises and an equivalent weight of 185–192 (available from Shell Development Company, Houston, Texas and identified as EPON 828 ®) was added. A solution quickly formed and the mixture was poured into two flat TEFLON ® molds (7.62 cm × 12.7 cm × 0.32 cm). TEFLON ® is a vinyl fluoride polymer manufactured by E. I. duPont deNemours and Co. of Wilmington, Del. The molds were placed in an oven, cured at 100° C. for 2 hours and post-cured at 160° C. for 3 hours. The pieces were hard, yellow glasses with a high gloss finish. These pieces were cut into 1.27 cm wide strips for testing.

Samples were tested for flammability according to procedures established by the Underwriter Laboratories Bulletin No. 94, STANDARD FOR TESTS FOR FLAMMABILITY OF PLASTIC MATERIALS FOR PARTS IN DEVICES AND APPLIANCES, Second Ed., Second Impression (as revised to Feb. 1, 1974) dated July 30, 1976. The Vertical Burning Test for classifying materials 94 V-0, 94 V-1, or 94 V-2 and described in Section 3 of this publication, was used. The average burn time for 10 ignitions was 3.8 seconds and the vertical burn test rating was V-0. The oxygen index determined by ASTM test D2863 was 30.4. The glass transition temperature (Tg) as measured by differential scanning calorimetry was 88° C.

EXAMPLE II

Example I above was repeated except that the tris(3-hydroxypropyl)phosphine oxide was eliminated from the resin hardener mixture. The heat cured epoxy resin burns completely, has an oxygen index of 19.1 and a glass transition temperature, measured by differential scanning calorimetry, of 125° C.

EXAMPLE III

Example I was repeated except that 13.2 g (0.06 mole) of tris(3-hydroxypropyl)phosphine oxide was substituted for the 18 g (0.08 mole) of tris(3-hydroxypropyl)phosphine oxide used in that Example. The resulting composition had an oxygen index of 32.7. The average burn time for 10 ignitions was 22 seconds and the vertical burn test rating was V-1. The glass transition temperature, measured by differential scanning calorimetry, was 108° C.

EXAMPLE IV

A mixture of 9.0 g (0.04 mole) of tris(3-hydroxypropyl)phosphine oxide, 27 g (0.18 mole) of phthalic anhydride, and 16.2 g (0.09 mole) of nadic methyl anhydride, were heated and stirred in a beaker under nitrogen to about 120° C. for 15–20 minutes until a homogeneous solution formed. The mixture on cooling to room temperature was a viscous oil. This mixture was again heated to 100° C. and 60 g (0.321 equivalents) of the epoxy resin described above in Example I was added. A solution quickly formed, was cast in molds and cured in an oven for 2 hours at 100° C. followed by curing for an additional 3 hours at 160° C. The castings were cut into 1.27 cm wide strips for testing. This product had an oxygen index of 30.4. The average burn time for 10 ignitions was 4.6 seconds and the vertical burn test rating was V-0. The glass transition temperature, measured by differential scanning calorimetry was 113° C.

EXAMPLE V

A mixture of 60 g (0.321 equivalents) of the epoxide resin described above in Example I and 12.1 g (0.054 mole) of tris(3-hydroxypropyl)phosphine oxide were heated at 170° C. for 90 minutes under nitrogen until a solution formed. The solution was cooled to 100° C. and 45.0 g (0.304 mole) of phthalicanhydride was added. The anhydride dissolved in 15 minutes with stirring and the mixture was poured into a mold and cured at 100° C. for 3 hours, 135° C. for 2 hours and finally 160° C. for 2.5 hours. The cured resin, when removed from the mold, was a hard, yellow glass having good physical characteristics. Mixtures made by this procedure have a shorter pot life than those made by the procedure described in Example I above and care must be taken to avoid gel formation before the material is poured into the mold. The cured resin has an average burn time of 4.7 seconds (V-0 rating by the UL-94 test), an oxygen index of 31, and the glass transition temperature was 120° C.

EXAMPLE VI

Sixty grams (0.321 equivalents) of the epoxide resin described above in Example I was weighed into a beaker with 30 g (0.20 mole) of phthalic anhydride, 18.0 g (0.10 mole) of nadic methyl anhydride and 18.0 g (0.08 mole) of sec-butyl bis(3-hydroxypropyl)phosphine oxide. This mixture is heated at 120° C. under nitrogen and stirred for 30 minutes at which time all solids are dissolved in the solution. The liquid mixture was then cast in a mold consisting of two 0.64 cm thick pyrex glass plates lined with a polyethylene terephthalate film manufactured by E. I. duPont deNemours & Co. of Wilmington, Del. under the trade name MYLAR ®. The MYLAR ® film is 0.08 mm (3 mils) thick with 0.32 cm TEFLON ® U-shaped spacer between the plates. The molds were placed in an oven at 100° C. for 2 hours and the resin further cured at 160° C. for 3 hours. The cured resin, when removed from the mold, consisted of a hard, slightly yellow sheet 0.32 cm thick having an average burn time of 11.7 seconds (UL-94 rating of V-1), an oxygen index of 31.8 and a glass transition temperature of 95° C.

EXAMPLE VII

Ninety-five grams (0.48 equivalents) of the epoxide resin described in Example I above was heated with 19.0 g (0.084 mole) of tris(3-hydroxypropyl)phosphine oxide in a beaker at 160° C. under nitrogen for 1 hour with stirring. The solution so obtained was cooled to 80° C. and 27.0 g (0.135 mole) of bis(4-aminophenyl)methane (commonly referred to as methylene dianiline) was added. The mixture was further stirred and heated at 100° C. for 30 minutes at which time the methylene dianiline had gone into solution. This mixture was cast in the TEFLON ® mold described in Example I and cured by heating in an oven at 100° C. for 3 hours and 200° C. for 1 hour. The product removed from the mold was a hard, amber colored glass. It has a burn time of 2.7 seconds (UL-94 rating of V-0), an oxygen index of 31.3, and a glass transition temperature of 105° C.

EXAMPLE VIII

Example VII above was repeated except that the tris(3-hydroxypropyl)phosphine oxide was not added to the composition. The resulting product (containing no fire retardant) had an oxygen index of 25.5 and burned to completion in the UL-94 vertical burn test. The glass transition temperature of this product was 175° C.

EXAMPLE IX

A solution of 60 g (0.321 equivalents) of the epoxide resin described in Example I above, 18.0 g (0.08 mole) of tris(3-hydroxypropyl)phosphine oxide, and 54.0 g (0.30 mole) of nadic methyl anhydride was prepared as described in Example I. A 60 g portion of this resin mixture was mixed with 60 g of glass fibers in a two-roll mill which was heated to a temperature between 50° C. and 60° C. The glass fibers were well coated after 30 minutes and the material was removed from the mill. The glass filled resin mixture was compression molded using a 5 cm disc mold and 15 g of the glass filled resin at 300° F. for 40 minutes, then increasing the pressure to 9500 PSI. The product was removed from the mold as a homogeneous 5cm disc.

EXAMPLE X

The preceding Example IX was repeated except that no glass fibers were added to the resin composition. The electrical properties of the product so prepared are compared with the electrical properties of the composition containing glass fibers and described in Example IX above are compared in Table III.

EXAMPLE XI

The preceding Example was repeated except that no tris(3-hydroxypropyl)phosphine oxide was added. The electrical properties of this cured epoxy resin containing no fire retardant additive are compared with the electrical properties of the cured product containing tris(3-hydroxypropyl)phosphine oxide with and without a glass filler in Table III.

EXAMPLE XII

Eighty grams of the epoxide resin (0.428 equivalents) described in Example I above was heated and stirred with 16.0 g (0.071 mole) of tris(3-hydroxypropyl)phosphine oxide at 180° C. under nitrogen for 30 minutes at which time all of the tris(3-hydroxypropyl)phosphine oxide has dissolved. The solution was cooled to 110° C. and 3.0 g (0.04 mole) of dicyandiamide were added. This mixture was heated for 30 minutes at 130° C. to dissolve the dicyandiamide and the resin was then poured into a preheated mold consisting of two 20 cm×25 cm×0.64 cm pyrex glass plates lined with polyvinyl fluoride film manufactured by E. I. duPont deNemours & Co. of Wilmington, Del. under the trade name TEDLAR ®. The two plates were separated by a 0.32 cm TEFLON ® U-shaped spacer and held together by C-clamps. The mold was placed in an oven at 200° C. for 2.5 hours to cure. After curing, the mold was cooled and disassembled for removal of a clear, hard, amber colored casting. The glass transition temperature for this casting was determined, by differential scanning calorimetry, to be 99° C.

EXAMPLE XIII

Example XII above was repeated except that 16.0 g (0.071 mole) of sec-butyl bis(3-hydroxypropyl)phosphine oxide was substituted for 16.0 g (0.071 mole) of tris(3-hydroxypropyl)phosphine oxide. The epoxide resin containing the sec-butyl bis(3-hydroxypropyl)phosphine oxide and dicyandiamide was cast and cured at a lower temperature than was employed in Example XII (160° C.-170° C. for 3 hours). The resulting product had a glass transition temperature of 64° C.

EXAMPLE XIV

Example XII above was repeated except that 12.6 g (0.06 mole) of tris(3-hydroxypropyl)phosphine oxide was substituted for 16.0 g (0.071 mole) of tris(3-hydroxypropyl)phosphine oxide. The cured resin had a glass transition temperature of 113° C.

EXAMPLE XV

A solution of 63.5 g (0.34 equivalents) of the epoxide resin of Example I above, 10.0 g (0.04 mole) of tris(3-hydroxypropyl)phosphine oxide and 4.0 g (0.06 mole) of dicyandiamide was prepared as described in Example XII above.

In a separate beaker, 19.0 g (0.03 mole) of tetrabromobisphenol A and 36.5 g (0.20 equivalents) of the epoxide resin described in Example I above were stirred and heated under nitrogen with 0.02 g of methyl tris(3-hydroxypropyl)phosphonium chloride as catalyst to 150° C. An exothermic reaction occurred with the temperature rising to 185° C. The temperature was maintained at 165° C. for 15 minutes and then cooled to room temperature. This hard and friable solid was broken into small pieces and added to the resin solution described in the first paragraph of this Example XV. This mixture was heated at 130° C. for 15 minutes at which time the mixture became homogeneous and the mixture was then poured into a preheated mold of the type described in Example XII above. The mold was placed in an oven at 200° C. for 2 hours, cooled, and opened to give a hard, clear, amber casting having a glass transition temperature of 122° C. when measured by differential scanning calorimetry.

EXAMPLE XVI

Thirty-six and one-tenth grams (0.19 equivalents) of the epoxide resin described in Example I above was heated and stirred with 7.25 g (0.03 mole) of tris(3-hydroxypropyl)phosphine oxide at 180° C. under nitrogen for 30 minutes at which time all of the tris(3-hydroxypropyl)phosphine oxide had dissolved. The solution was cooled to 110° C. and 3 g (0.04 mole) of dicyandiamide were added. This mixture was heated for 30 minutes at 130° C. to dissolve the dicyandiamide.

In a separate beaker, 8.32 grams (0.015 mole) of tetrabromobisphenol A and 15.98 g (0.085 equivalents) of the epoxide resin described in Example I above were stirred and mixed under nitrogen with 0.01 g of methyl tris(3-hydroxypropyl)phosphonium chloride as catalyst to 150° C. An exothermic reaction occured with the temperature rising to 185° C. The temperature was maintained at 165° C. for 15 minutes. This mixture was then cooled to about 100° C. and 27.9 g (0.15 equivalents) of the epoxide resin described in Example I above was added and mixed to form a homogeneous solution. The resin solution was added to the resin composition described in the first paragraph of this Example and cast in a preheated mold and cured at 200° C. for 2 hours. The cured product was a hard, amber glass having a glass transition temperature of 121° C.

EXAMPLE XVII

Two hundred grams of the resin solution containing tris(3-hydroxypropyl)phosphine oxide and dicyandiamide prepared as described in Example XII above was heated at 110° C. for 30 minutes after the dicyandiamide had gone into solution and poured into a metal pan 15 cm in diameter. Nine pieces of glass cloth measuring 15 cm × 10 cm and manufactured by Burlington Mills of Altavista, Va.; (style 7628/50/97 with I399 finish) were dipped into the resin to thoroughly cover the cloth and hung in an oven at 185° C. for 4–5 minutes. The prepregs which were no longer tacky, were then taken from the oven and found to contain 38 weight percent resin. The prepregs were stapled together and pressed at 390° F. (199° C.) at 400 psi (2.76 MPa) for 1 hour. The final laminate had a resin content of 37% and a glass transition temperature of 94° C.

EXAMPLE XVIII

Four hundred grams of the epoxide resin (2.14 equivalents) described in Example I above was heated and stirred with 80.0 g (0.355 mole) of tris(3-hydroxypropyl)phosphine oxide at 180° C. under nitrogen for 30 minutes at which time all of the tris(3-hydroxypropyl)phosphine oxide had dissolved. The solution was cooled to 100° C. and 15.0 g (0.22 mole) of dicyandiamide were added. This mixture is heated for 30 minutes at 130° C. to dissolve the dicyandiamide and the resin was then cooled and dissolved in a mixture of 100 g methylethyl ketone and 100 g of 2-methoxyethanol.

Nine pieces of glass cloth measuring 15 cm × 10.0 cm manufactured by Burlington Mills type 7628/50/97 with I399 finish were dried in an oven at 200° C. for 1.5 hours; immersed in the resin solution described above for 30 seconds and dried in an oven at 180° C.-185° C. for 5 minutes. The resulting prepregs contained 40% resin and were not tacky. The prepregs were stapled together and pressed at 390° F. (199° C.) and 400 psi (2.76 MPa) for 1 hour between TEFLON ® lined metal plates. The final laminate contained 39% resin and its glass transition temperature is 98° C. The laminate has no visable air bubbles and was characterized by excellent cohesive strength.

EXAMPLE XIX

A resin solution containing tetrabromobisphenol A (TBBP-A) was prepared by heating 100 g (0.53 equivalents) of the epoxide resin described in Example I above and 54 g (0.10 mole) of tetrabromobisphenol A with 0.1 g of methyl trishydroxypropyl phosphonium chloride (as catalyst) to 150° C. with stirring under nitrogen. An exothermic reaction ensued with the temperature rising to 185° C. The temperature was maintained at 185° C. for 15 minutes and cooled to room temperature. The cooled resin, an amber glass, was broken into small pieces, and 71.2 g of this product was dissolved in 21.6 g of acetone. To this solution was added 2.8 g (0.04 mole) of dicyandiamide dissolved in 13 g of dimethyl formamide. A slight precipitate formed that dissolved when the solution was warmed to 35 ° C.

Eight 7.6 cm × 7.6 cm pieces of glass cloth were dipped into the resin solution and dried at 150° C. for 6 minutes. These pieces contained 49% resin and were not tacky. These pieces were pressed at 340° F. (171° C.) and 200 psi (1.38 MPa) for 30 minutes. The laminate when cooled, contained 31% resin. The glass transition temperature was 124° C.

EXAMPLE XX

Forty-two and three-tenths grams (0.13 equivalents) of an epoxide resin derived from 2 moles of epichlorohydrin and 1 mole of 2,2bis(3,5-dibromo-4-hydroxyphenyl)propane, commonly referred to as tetrabromobisphenol A, having an epoxide equivalent weight of 305-355 and a Durrans' softening point of 40° C.-55° C. (available from Dow Chemical Company, Midland, MI. and identified as DER 542 ®) is mixed under nitrogen at 120° C. with 55.8 g (0.30 equivalents) of the epoxide resin described above in Example I. To this resin mixture is added (under nitrogen) 40 g (0.27 mole) of phthalic anhydride and 24.1 g (0.14 mole) of nadic methyl anhydride with stirring while maintaining the temperature at 120° C. When the mixture becomes homogeneous, 0.5 g of benzyl dimethyl amine was added and the mixture is cast in a mold as described in Example VI and cured at 100° C. for 2 hours and 160° C. for 3 hours. The resulting yellow glass had an oxygen index of 32.7 and a glass transition temperature of 140° C.

EXAMPLE XXI

The preceding Example was repeated except that 9.7 g (0.03 equivalents) of the epoxy resin DER 542 ® was substituted for 42.3 g (0.13 equivalents) of the DER 542 ® employed in the preceding Example and 74.4 g (0.40 equivalents) of the epoxide of Example I was substituted for the 55.8 g (0.30 equivalents) of that resin employed in the preceding Example. The oxygen index of this product was 23.5 and the glass transition temperature was 140 ° C.

EXAMPLE XXII

Example XX above was repeated except that 19.9 g (0.06 equivalents) of DER 542 ® was substituted for 42.3 g (0.13 equivalents) of that resin and 68.6 g (0.37 equivalents) of the resin of Example I was substituted for 55.8 g (0.30 equivalents) of that resin. The resulting product had an oxygen index of 26 and a glass transition temperature of 138° C.

EXAMPLE XXIII

Example XX above was repeated except that 30.8 g (0.09 equivalents) of DER 542 ® was substituted for 42.3 g (0.13 equivalents) of that resin and 62.4 g (0.33 equivalents) of the epoxide of Example I above was substituted for 55.8 g (0.30 equivalents) of that resin. The resulting product had an oxygen index of 29.3 and a glass transition temperature of 1302 C.

EXAMPLE XXIV

A mixture of 34.6 g (0.19 equivalents) of the epoxide resin described in Example I above, 5.9 g (0.026 mole) of tris(3-hydroxypropyl)phosphine oxide, 20.0 g (0.14 mole) of phthalic anhydride and 12.0 g (0.08 mole) of nadic methyl anhydride was stirred and heated under nitrogen at 110° C. until a homogeneous solution was formed. To this homogeneous resin mixture is added 8.9 g (0.03 equivalents) of the brominated epoxy resin described in Example XX above (DER 542 ®) and stirring was continued until the mixture was homogeneous. The resin mixture was cast in a mold and cured in an oven at 100° C. for 2 hours and 160° C. for 3 hours. The product was a hard, yellow glass characterized by an oxygen index of 34.3 and a glass transition temperature of 130° C.

EXAMPLE XXV

Example XXIV above was repeated with the following changes:

| | |
|---|---|
| EPON 828 ® | 36.5 g (0.20 equivalents) |
| DER 542 ® | 5.0 g (0.015 equivalents) |
| tris (3-hydroxypropyl) phosphine oxide | 2.9 g (0.013 mole) |

The cured product had an oxygen index of 28.8 and a glass transition temperature of 109° C.

EXAMPLE XXVI

Example XXIV above was repeated with the following changes:

| | |
|---|---|
| EPON 828 ® | 36.5 g (0.20 equivalents) |
| DER 524 ® | 5.2 g (0.016 equivalents) |
| tris (3 hydroxypropyl) phosphine oxide | 5.7 g (0.025 mole) |

The resulting product had a oxygen index of 31 and a glass transition temperature of 110° C.

EXAMPLE XXVII

Example XXIV above was repeated with the following changes:

| | |
|---|---|
| EPON 828 ® | 34.6 g (0.019 equivalents) |
| DER 542 ® | 8.4 g (0.025 equivalents) |
| tris (3-hydroxypropyl) phosphine oxide | 2.9 g (0.013 mole) |

The resulting product had an oxygen index of 30.7 and a glass transition temperature of 110° C.

TABLE I

3-HYDROXYPROPYL PHOSPHINE OXIDES IN EPOXY RESINS

| Example Number | Additive | Wt. % | % P | Hardener[1] | Anhydride[2] Equivalents | Oxygen[3] Index | UL-94[4] Rating | UL-94[4] Average Burn Time | Tg (°C.) |
|---|---|---|---|---|---|---|---|---|---|
| I | THPPO[5] | 14.3 | 2.0 | PA/NMA = 2 | .95 | 30.4 | V-0 | 3.8 seconds | 88 |
| II | None | — | — | PA/NMA = 2 | .95 | 19.1 | Burn | | 125 |
| III | THPPO[5] | 10.7 | 1.5 | PA/NMA = 2 | .95 | 32.7 | V-1 | 22.0 seconds | 108 |
| IV | THPPO[5] | 8.0 | 1.1 | PA/NMA = 2 | .85 | 30.4 | V-0 | 4.6 seconds | 113 |
| V | THPPO[5] | 10.3 | 1.4 | PA | .95 | 31.0 | V-0 | 4.7 seconds | 120 |
| VI | BHPPO[6] | 14.3 | 2.0 | PA/NMA = 2 | .95 | 31.8 | V-1 | 11.7 seconds | 95 |
| VII | THPPO[5] | 13.5 | 1.9 | MDA[7](28 PHR) | — | 31.3 | V-0 | 2.7 seconds | 105 |
| VIII | None | — | — | MDA[7](28 PHR) | — | 25.5 | Burn | | 175 |

[1]PA = Phthalic anhydride; NMA = Nadic methyl anhydride
[2]Ratio of moles of anhydride/equivalents epoxide
[3]ASTM D 2863
[4]UL-94 Vertical Burn Test - Rating and average burn times
[5]Tris(3-hydroxypropyl)phosphine oxide
[6]Sec-butyl bis(3-hydroxypropyl)phosphine oxide
[7]Methylene dianiline is bis(4-aminophenyl)methane

TABLE II

3-HYDROXYPROPYL PHOSPHINE OXIDES IN EPOXY RESINS CURED WITH DICYANDIAMIDE

| Example Number | Additive | Wt. % | UL-94[1] Rating | Average Burn Time | Tg |
|---|---|---|---|---|---|
| XII | THPPO[3] | 16 | V-0 | 2.8 seconds | 99° C. |
| XIII | BHPPO[4] | 16 | V-0 | 3.2 seconds | 64° C. |
| XIV | THPPO[3] | 12.6 | V-1 | 8.2 seconds | 113° C. |
| XV | THPPO[3] | 7.5 | | | |
| | TBBP-A[2] | 21.7 | V-0 | 1.0 seconds | 122° C. |
| XVI | THPPO[3] | 7.4 | | | |
| | TBBP-A[2] | 8.6 | V-0 | 3.5 seconds | 121° C. |
| XVII | TBBP-A[2] | 35 | V-0 | 1.0 seconds | 124° C. |

[1]Rating and average burn time for 10 ignitions
[2]Tetrabromobisphenol A
[3]Tris(3-hydroxypropyl)phosphine oxide
[4]Sec-butyl bis(3-hydroxypropyl)phosphine oxide

TABLE III

EPOXY RESINS CONTAINING 3-HYDROXYPROPYLPHOSPHINE OXIDE - ELECTRICAL PROPERTIES

| Example | Additive | Hardener[1] | Filler | Dielectric Const.[2] | AC Dissipation Factor[2] | Volume[3] Resistivity (ohm-cm) |
|---|---|---|---|---|---|---|
| IX | THPPO[4] (13.6 wt. %) | NMA | 50% glass | 100 cps 4.4 | .0008 | |
| | | | | $10^3$ cps 4.4 | .0039 | |
| | | | | $10^4$ cps 4.4 | .0080 | |
| | | | | $10^5$ cps 4.3 | .0171 | |
| X | THPPO[4] (13.6 wt %) | NMA | None | 100 cps 3.6 | .0012 | $1.5 \times 10^{16}$ |
| | | | | $10^3$ cps 3.6 | .0042 | |
| | | | | $10^4$ cps 3.6 | .0080 | |
| | | | | $10^5$ cps 3.5 | .015 | |
| XI | Blank | NMA | None | 100 cps 4.1 | .0015 | $2 \times 10^{15}$ |
| | | | | $10^3$ cps 4.1 | .0023 | |
| | | | | $10^4$ cps 4.0 | .0041 | |
| | | | | $10^5$ cps 3.8 | .015 | |

[1]NMA is nadic methyl anhydride
[2]ASTM D 150
[3]ASTM D 257
[4]Tris(3-hydroxypropyl)phosphine oxide

TABLE IV

EPOXY RESINS-USE OF BROMINE WITH 3-HYDROXYPROPYL PHOSPHINE OXIDE[1]

| Example | Wt. % THPPO[4] | % P | Wt. % DER 542 ® | % Br | OI[2] | Rating | Average Burn Time | Tg |
|---|---|---|---|---|---|---|---|---|
| II | — | — | — | — | 19.1 | Burn | | 125° C. |
| XX | — | — | 26 | 12 | 32.7 | V-0 | 1.8 seconds | 140° C. |
| XXI | — | — | 6.2 | 3 | 23.5 | Burn | | 140° C. |
| XXII | — | — | 13.0 | 6 | 26.0 | V-1 | 25.0 seconds | 138° C. |
| XXIII | — | — | 19.5 | 9 | 29.3 | V-1 | 5.9 seconds | 130° C. |
| XXIV | 7.2 | 1.0 | 10.8 | 5 | 34.3 | V-0 | 1.4 seconds | 130° C. |
| XXV | 3.8 | 0.5 | 6.5 | 3 | 28.8 | V-1 | 11.3 seconds | 109° C. |
| XXVI | 7.2 | 1.0 | 6.5 | 3 | 31.0 | V-0 | 2.5 seconds | 110° C. |
| XXVII | 3.7 | 0.5 | 10.6 | 5 | 30.7 | V-0 | 2.6 seconds | 110° C. |

[1]The hardener used was phthalic anhydride and nadic methyl anhydride (2:1). The ratio of moles of anhydride to equivalents of epoxide was 0.95.
[2]Oxygen index ASTM D 2863.
[3]UL-94 test. Rating and average burn time for 10 ignitions.
[4]Tris(3-hydroxypropyl)phosphine oxide.

We claim:

1. A flame retardant hardener for epoxy resins comprising the reaction product of an anhydride with a 3-hydroxypropylphosphine oxide having the general formula:

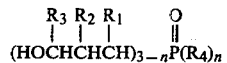

wherein $R_1$ may be the same or a different radical selected from the group consisting of hydrogen, phenyl, hydroxymethyl and alkyl radicals of 1–4 carbon atoms, $R_2$ may be the same or a different radical selected from the group consisting of hydrogen, hydroxymethyl, and alkyl radicals of 1–4 carbon atoms, $R_3$ may be the same or a different radical selected from the group consisting of hydrogen and methyl radicals, $R_4$ is an alkyl radical 2–8 carbon atoms and n is either 0 or 1.

* * * * *

UNITED STATES PATENT AND TRADEMARK OFFICE
CERTIFICATE OF CORRECTION

PATENT NO. : 4,440,944

DATED : April 3, 1984

INVENTOR(S) : Edward R. Fretz, Jr. and Joseph Green

It is certified that error appears in the above—identified patent and that said Letters Patent is hereby corrected as shown below:

Column 6, line 45, "has" should read --had--. Column 8, line 68, "2,2bis(3,5-dibromo-4-hydroxyphenyl)propane," should read --2,2-bis(3,5-dibromo-4-hydroxyphenyl)propane,--. Column 9, line 46, "1302 C" should read --130°C--. Column 10, line 32, "DER 524®" should read --DER 542®--.

Table II, column 1, under the Heading "Additive", the following should appear:

$THPPO^3$ $BHPPO^4$ $THPPO^3$ $THPPO^3$
$TBBP-A^2$ $THPPO^3$
$TBBP-A^2$ $TBBP-A^2$

UNITED STATES PATENT AND TRADEMARK OFFICE
CERTIFICATE OF CORRECTION

PATENT NO. : 4,440,944
DATED : April 3, 1984
INVENTOR(S) : Edward R. Fretz, Jr. and Joseph Green It is certified that error appears in the above—identified patent and that said Letters Patent is hereby corrected as shown below:

In Table IV, the Heading should appear as follows:

| Example | Wt.% THPPO$^4$ | % P | Wt.% DER 542® | % Br | OI$^2$ | UL-94$^3$ Rating | Average Burn Time | Tg |
|---|---|---|---|---|---|---|---|---|

Signed and Sealed this

Twenty-seventh Day of November 1984

[SEAL]

Attest:

GERALD J. MOSSINGHOFF

Attesting Officer    Commissioner of Patents and Trademarks